UNITED STATES PATENT OFFICE.

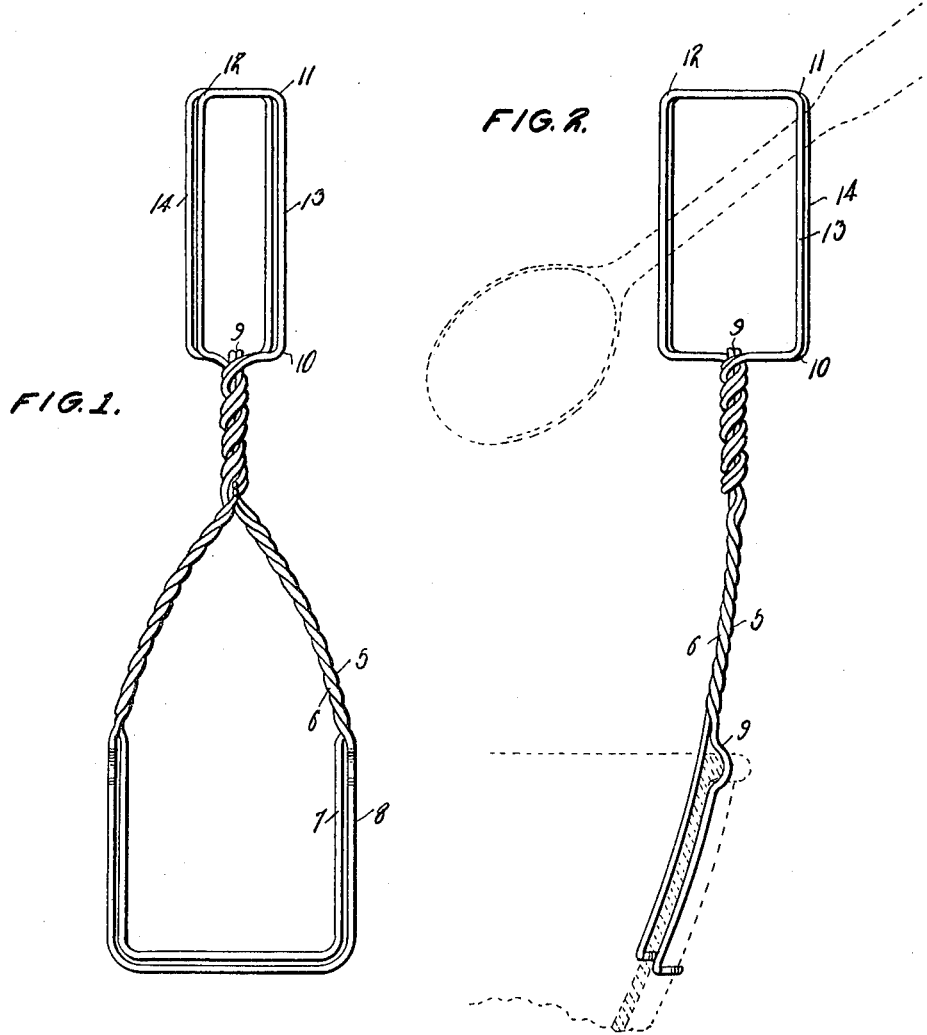

FRANCES S. FLETCHER, OF PASADENA, CALIFORNIA.

SPOON-HOLDER.

1,293,069.  Specification of Letters Patent.  Patented Feb. 4, 1919.

Application filed March 5, 1918. Serial No. 220,555.

*To all whom it may concern:*

Be it known that I, FRANCES S. FLETCHER, a subject of Great Britain, residing at Pasadena, in the county of Los Angeles and State of California, have invented certain new and useful Improvements in Spoon-Holders, of which the following is a specification.

My invention relates to spoon holders for cooking utensils, dishes, or the like.

The principal object of the present invention is to provide a spoon holder which will support the spoon in a position where the same may be conveniently grasped by the person and yet at the same time prevent the same from becoming hot as it would if it were left in the receptacle.

The second object of the invention is to provide a spoon holder of this character which will be effectively retained in position on the receptacle and effectively hold the spoon.

As another object of the invention it provides a spoon holder which may be quickly and readily engaged and disengaged from the dish and at the same time will not mar or damage the dish or receptacle.

Another important object of the invention is to provide a spoon holder which is simple and strong in construction, which is efficient in use and which consists of few parts and which may be manufactured and placed on the market at a minimum cost.

The above and other objects and advantages will be fully disclosed in the following specification and illustrated in the accompanying drawings and the inventive features will be explicitly defined in the appended claims.

The invention consists of formations, arrangement and constructions to be hereinafter specifically referred to and illustrated in the accompanying drawings wherein:—

Figure 1 is a front elevation of my improved device,

Fig. 2 is a side elevation of the same showing it in operative position on a cooking utensil and grasping a spoon, the spoon and cooking utensil being shown in dotted lines, and Fig. 3 is a view looking at the top of my improved device.

Like characters of reference indicate like parts in all of the views. Referring to the drawing in detail the numerals 5 and 6 designate two lengths of wire which are bent intermediate the ends to provide substantially U-shaped dish or cooking utensil engaging jaws 7 and 8. These jaws 7 and 8 are longitudinally bowed and the jaw 8 is provided with arcuate seats 9 which accommodate the beading of the receptacle as illustrated in Fig. 2. The lengths of wire are then twisted upon themselves and extended in divergent relation.

One extremity of the wires is twisted together as at 9' while the opposite extremities of the wires are twisted spirally about the twisted portion 9' and thence extended laterally and bent at right angles as designated by the numeral 10. These extremities are then bent at 11 and 12, at right angles and then extended in parallelism to that part of the wire between the bends 10 and 11. The extremities are then extended inwardly and twisted spirally about the first spiral part mentioned. This manner of bending the wires affords elongated spoon engaging jaws 13 and 14. These jaws are disposed at an oblique angle with respect to the horizontal portion of the U-shaped dish engaging jaw.

From the above disclosure it will be seen that I provide a simple and efficient device for holding spoons, and yet at the same time may be placed in the market at a minimum cost.

The embodiment of the invention herein set forth and illustrated is considered to be the preferred form of the invention, but I wish to here state that the invention can be embodied in constructions other than the one specified and that such embodiments of the invention are only governed by the subjoined claims.

What is claimed is:

1. A spoon holder formed from two sections of wire, each of the sections being bent to provide a U-shaped receptacle engaging jaw, the sections then being extended in divergent relation and twisted together, one of the extremities of each of the sections being bent to provide substantially rectangular clamping jaws for holding a spoon.

2. A spoon holder formed from two sections of wire, each of the sections being bent to provide a U-shaped receptacle engaging jaw, the side bars of the U-shaped jaws being longitudinally bowed, each of the side bars being formed with an arcuate seat to receive the beading at the upper edge of the receptacle, the sections being then extended in divergent relation and twisted together, one of the extremities of each of the sections is bent to provide a substantially rectangular clamping jaw for holding a spoon.

3. A spoon holder formed of two separate strands of wire twisted together at one end to form a vertical shank, the two strands of the wire being separated at the lower end of the shank and bent to provide opposing lower jaw frames, said strands being twisted together again after forming said jaw frames, and then extended along the length of said shank toward the free end thereof, the strands being again separated at the free end of the shank and bent to provide a pair of opposing upper jaw frames.

4. A spoon holder which comprises two strands of wire, each of said strands being bent to form a U-shaped jaw member, said lengths being connected together at one end after forming said jaw members, and extended to provide a shank the opposite ends of said lengths being also connected together and wrapped around the length of said shank, said last mentioned end portion being then divided and bent to provide opposing jaw frames and having the free extremities thereof secured to said shank.

5. A spoon holder which comprises two lengths of wire, each of said lengths being bent to provide a U-shaped jaw member and having its opposite end portion twisted about the corresponding end portions of the remaining length, one twisted extremity of said wires being extended to form a shank and the opposite extremity thereof being also twisted together and wrapped along the length of said shank, said last mentioned extremity having the two strands thereof separated and bent to provide substantially rectangular jaw frames, the free ends of said strands being then wrapped along the length of said shank and secured.

In testimony whereof I affix my signature in presence of two witnesses.

FRANCES S. FLETCHER.

Witnesses:
C. L. STRANG,
CLIFF E. WITTER.

Copies of this patent may be obtained for five cents each, by addressing the "Commissioner of Patents, Washington, D. C."